UNITED STATES PATENT OFFICE.

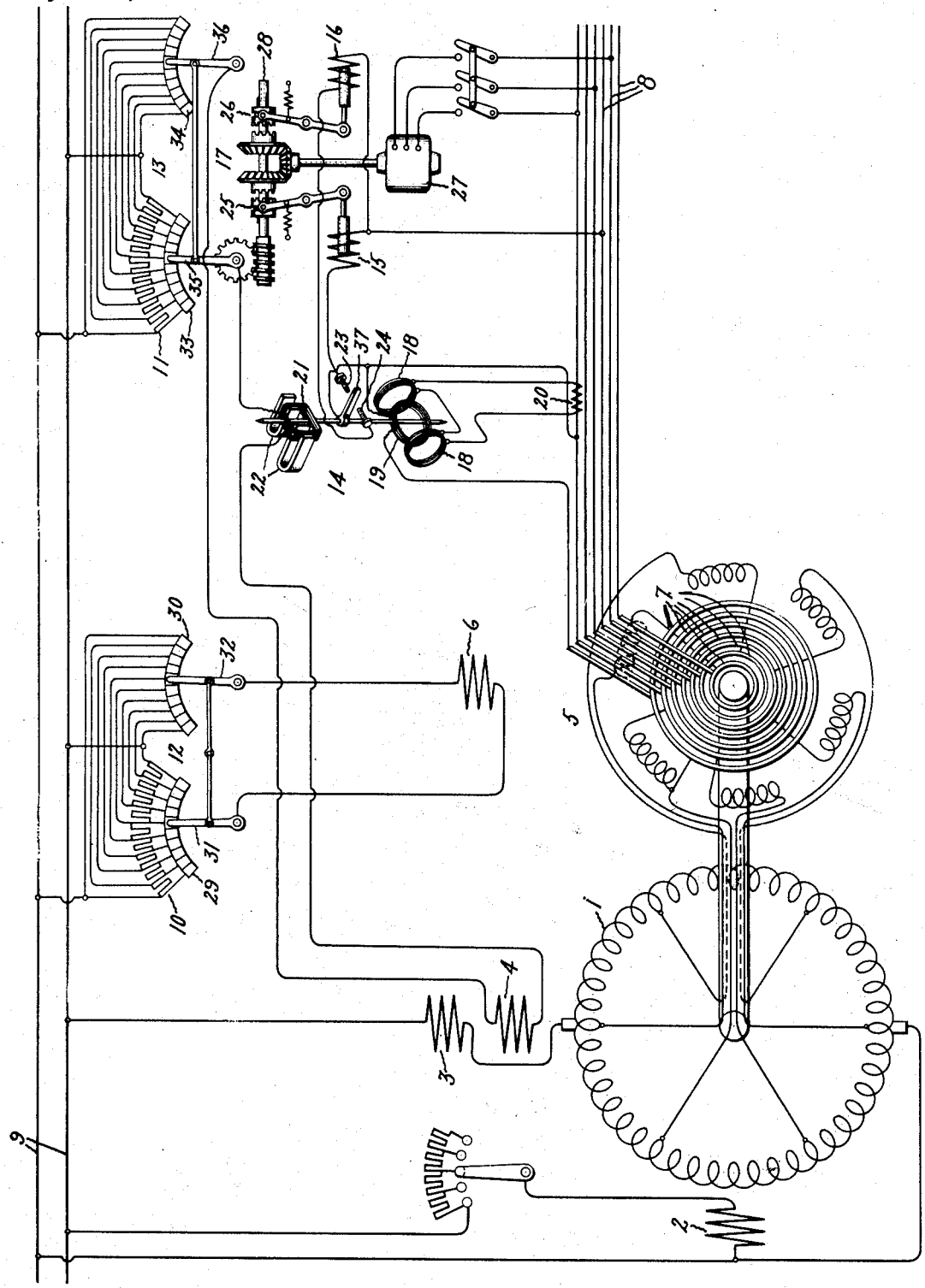

JOHN B. BASSETT, OF SCHENECTADY, NEW YORK, ASSIGNOR TO GENERAL ELECTRIC COMPANY, A CORPORATION OF NEW YORK.

ROTARY CONVERTER.

1,246,700.  Specification of Letters Patent.  Patented Nov. 13, 1917.

Application filed April 19, 1915, Serial No. 22,293. Renewed August 12, 1916. Serial No. 114,642.

*To all whom it may concern:*

Be it known that I, JOHN B. BASSETT, a citizen of the United States, residing at Schenectady, county of Schenectady, State of New York, have invented certain new and useful Improvements in Rotary Converters, of which the following is a specification.

My invention relates to rotary converters and a method of operating the same. It is particularly applicable to rotary converters provided with commutating poles and operated in connection with boosters mechanically connected thereto, the field of the boosters being variable for the purpose of varying the ratio between the alternating and direct current voltages. When a booster is mechanically connected to a rotary converter, it imposes a motor load on the converter when boosting and a generator load on the converter when bucking; or, in other words, when the booster is boosting the voltage of the converter it must be driven as a generator by the converter, but when operating to buck the converter voltage the booster operates as a motor transmitting mechanical energy to the converter. Under such conditions, the effective armature reaction of the rotary converter varies through wide limits and directly affects the magnetization of the commutating poles. The armature reaction caused by the booster when boosting the converter voltage is in a direction to add to the excitation of the commutating poles of the converter, whereas under the bucking condition the armature reaction caused by the booster is in a direction to subtract from the excitation of the commutating poles of the converter.

My invention provides a novel and simple exciting system and a novel method for automatically adjusting the strength of the commutating field of a booster type rotary converter to the correct value under all conditions of buck and boost. My novel exciting system comprises electro-responsive means subject to the control of the energy conversion of the booster, or in other words, to the energy electrically interchanged between the booster machine and the supply circuit in either the bucking or boosting operation. This electro-responsive means is preferably so constructed that it is responsive to the voltage and current of the booster machine.

The commutating field of the converter should also be varied in accordance with the current delivered by the converter, and I therefore preferably provide the converter with two commutating field windings, one of which is connected in series with the direct current brushes of the converter and the other of which is connected to a source of voltage which may be varied over the requisite range and also reversed if desired, subject to the control of an electro-responsive device which may have one element provided with coils energized by the current and voltage of the booster and a balancing element provided with a coil energized by the current flowing in the commutating field winding which is connected to the above mentioned source of voltage. With such an arrangement, since the armature reaction of the converter depends upon the motor or generator load of the booster, that is upon the booster watts, and also upon the current delivered by the converter, it will be seen that by the use of my invention the commutating field strength will be automatically varied in accordance with all of these factors.

For a better understanding of my invention reference may be had to the following description taken in connection with the accompanying drawing in which the single figure shows diagrammatically one embodiment of my invention.

In the drawing, I have shown a rotary converter 1 having a main exciting winding 2, a series commutating or interpole field winding 3 and an auxiliary commutating field winding 4. The converter 1 is mechanically connected to a booster 5 having a field winding 6. The booster is shown as being of the synchronous type connected through collector rings 7 to alternating current mains 8 and having its alternating current windings connected to the armature windings of the converter. The armature of the converter is shown as being connected to a source of exciting current comprising the direct current mains 9 as is the auxiliary commutating field winding 4 and the booster field winding 6. The field of the booster may be varied and reversed by connecting its field winding to a source of voltage which may be varied over a wide range and reversed. This source of voltage comprises a set of resistances 10 connected across the direct current mains 9. The field produced by the auxiliary commutating field winding may be varied and reversed by connecting it to a source of voltage which may be varied over a wide range and reversed. This source of voltage also comprises a set of resistances 11 connected across the direct current mains 9. The sets of resistances 10 and 11 are preferably the resistance elements of double dial rheostats 12 and 13. The current supplied to the field winding 6 of the booster and the current supplied to the auxiliary commutating field winding 4 are therefore adjusted or regulated by means of the double dial rheostats 12 and 13.

The double dial rheostat 13 is controlled or operated by an electro-responsive or motor means subject to the control of the energy conversion of the booster machine comprising a contact making wattmeter 14 through solenoids 15 and 16 and gearing 17. The solenoids 15 and 16 constitute the energizing coils of electro-magnets which may be of any desired form. The contact making wattmeter comprises a wattmeter element and a balancing element. The wattmeter element comprises two mutually interacting elements, one of which has a coil 18 energized proportionally to the current flowing through the booster and the other of which has a coil 19 energized proportionally to the voltage of the booster, both in direction and magnitude. The voltage coil 19 is shown as connected across one phase of the booster winding and is consequently energized by the voltage in this phase, and the current coil 18 is shown as being connected to a current transformer 20 in the same phase of the booster. The balancing element of the wattmeter comprises a coil 21 energized by the current flowing in the circuit of the auxiliary commutating field winding 4, it being connected in the circuit of this winding. The balancing element also has permanent magnets 22. The movable contact 37 and the stationary contacts 23 and 24 of the contact making wattmeter control the circuits of solenoids 15 and 16, which in turn control clutches 25 and 26. The gearing 17 is driven by a motor 27. When one or the other of the clutches 25 or 26 is operated by one or the other of the solenoids the gearing is connected to the shaft 28 so as to drive it in one direction or the other and consequently the double dial rheostat 13 to which the shaft 28 is mechanically connected, the motor 27 being in continuous operation and always rotating in the same direction.

The set of resistances 10 of the double dial rheostat 12 is connected to two rows of contacts 29 and 30. The terminals of the booster field 6 are connected to arms 31 and 32 of this rheostat, these arms being rigidly connected together. When these arms engage the extreme left hand contacts, the full voltage of the mains is applied to this field winding in one direction. By moving the arms to adjacent contacts, a voltage less than that of the mains is applied to this field winding. A further movement of the arms toward the right still further decreases the voltage applied to the winding 6. When the arms engage the middle contacts, no voltage is applied to the winding 6. A further movement of the arms toward the right applies a voltage less than the line voltage to the winding 6 which is in the opposite direction to that which was applied when the arms engaged contacts to the left of the middle. As the arms approach the extreme right hand contacts, the voltage applied increases until they engage these latter contacts, when full voltage is applied to the winding 6 in the opposite direction to that applied when the arms engaged the extreme left hand contacts.

Similarly, the set of resistances 11 of the double dial rheostat 13 is connected to two rows of contacts 33 and 34, and the terminals of the auxiliary commutating field winding 4 are connected to the arms 35 and 36, which are rigidly connected together and engage the rows of contacts 33 and 34. The voltage applied to the field winding 4 is varied and reversed as the arms 35 and 36 move from left to right as explained above in connection with the booster field winding 6.

The operation of my arrangement is as follows:—

Assume now that the arms 31, 32, 35 and 36 are in their mid positions, in which case no voltage is applied to either windings 6 or 4, and consequently no current flows in them. The booster 5 then neither bucks nor boosts and therefore generates substantially no voltage. No current then flows in the voltage coil 19 of the wattmeter element of the contact making wattmeter and therefore no torque is developed in this element. Similarly no current flows in the coil 21 of the balancing element and consequently the movable contact 37 of the contact making wattmeter stays in its mid position and does not close the circuit of either of the solenoids 15 or 16. If now it is desired to raise the voltage delivered by the rotary converter, the arms 31 and 32 are moved in such a direction that a voltage is applied to the field winding 6 of the booster so that it operates as a generator. A voltage is now generated in the phase of the booster across which the coil 19 of the contact making wattmeter is connected, and assuming that the rotary is delivering a load, current flows through the booster and the coil 18 is also energized, the contact 37 moving so as to close the circuit of one or the other of the solenoids 15 or 16 through the contact 23 or 24, depending upon the electrical connections, thus throwing in one or the other of the clutches 25 or 26, whereupon the arms 35 and 36 begin to move as the gearing 17 is in constant motion. A voltage is thereby applied to the auxiliary commutating field winding 4 so that the field produced by it opposes the field produced by the series commutating field winding 3. The arms continue to move until (considering a constant load on the converter) the current supplied the winding 4 is sufficient to produce a torque in the coil 21 of the balancing element equal to the torque in the wattmeter element of the contact making wattmeter. This will cause the contact 37 to move and open the circuit of the solenoid 15 or 16 and the arms 35 and 36 will come to rest. If the load on the rotary increases the torque of the wattmeter element will again predominate and the solenoid which was previously energized will again be energized to increase the current in commutating field winding 4, the arms 35 and 36 moving until a balance is again reached. If the load on the rotary decreases, the torque of the balancing element will predominate and the solenoid which was not previously energized will now be energized and will cause the arms 35 and 36 to move to decrease the voltage applied to the winding 4 until a balance is again reached. With the windings arranged as shown in the drawing, the arms 35 and 36 are moved to the right of their mid position for the boost condition.

If it is desired to lower the voltage of the converter, the arms 31 and 32 are moved in the opposite direction from the mid position, in which case, the booster operates as a motor and generates a voltage in the opposite direction to that generated when acting as a generator. The voltage applied to the coil 19 is now in the opposite direction and the contact making wattmeter closes the circuit of the solenoid which throws the clutch which moves the arms 35 and 36 so as to apply a voltage to the auxiliary commutating field winding 4 whereby the field produced by it assists the field produced by the series commutating field winding. An increase of load on the converter increases the strength of the auxiliary commutating field winding and a decrease in load decreases the strength of this field in the same way as described above in connection with the operation of the booster 5 as a generator.

By providing the double dial rheostat 12 with a great number of resistance elements, the amount of boost or buck may be regulated by very small steps, and by providing the double dial rheostat 13 with a great number of resistance elements and properly designing the gearing 17 so that the shaft 28 rotates at comparatively low speed, the strength of the commutating field may be accurately adjusted to take care of all variation in armature reaction of the converter due to the variations in motor or generator load of the booster and to the variations in load on the converter.

The booster 5 and rotary converter 1 are shown as six phase machines and the motor 27 as a three phase machine, but it is evident that they may be of any number of phases. The coils 18 and 19 of the contact making wattmeter are shown as being connected to the same phase of the booster, but they may be differently connected, as for instance, one coil may be in one phase and the other in a diametrically opposite phase. Under certain conditions, the series commutating field winding may be dispensed with. The booster 5 is shown as being of the synchronous type but obviously it might be of any well known type. I aim in the appended claims to cover all such modifications, as well as any other modifications which do not depart from the spirit and scope of my invention.

What I claim as new and desire to secure by Letters Patent of the United States, is:

1. In combination, a rotary converter having a commutating field winding, a booster mechanically connected thereto, means for varying the field of said booster, and means responsive to the voltage and current of said booster for controlling said commutating field.

2. In combination, a rotary converter having a commutating field winding, a booster mechanically connected thereto, means for varying and reversing the field of said booster, and means responsive to the voltage and current of said booster and their relative directions for controlling said commutating field.

3. In combination, a rotary converter having a series commutating field winding and an auxiliary commutating field winding, a booster mechanically connected to said rotary converter, means for varying and reversing the field of said booster, and means responsive to the voltage and current of said booster and their relative directions for controlling said commutating field.

4. In combination, a rotary converter having a commutating field winding, a booster mechanically connected thereto, means for varying the field of said booster, means for varying the field produced by said commutating field winding, and means responsive to the voltage and current of said booster for controlling said last mentioned means.

5. In combination, a rotary converter having a commutating field winding, a booster mechanically connected thereto, means for varying and reversing the field of said booster, means for varying and reversing the field produced by said commutating field winding, and means responsive to the voltage and current of said booster and their relative directions for controlling said last mentioned means.

6. In combination, a rotary converter having a series commutating field winding and an auxiliary commutating field winding a booster mechanically connected to said converter, means for varying and reversing the field of said booster, means for varying and reversing the field produced by said auxiliary commutating field winding, and means responsive to the voltage and current of said booster and their relative directions for controlling said last mentioned means.

7. In combination, direct current mains, a rotary converter having a commutating field winding, a booster mechanically connected to said converter, means for varying and reversing the field of said booster, a set of resistances connected across said mains, means for changing the connection of said commutating field winding to said resistances and for reversing said field winding, and means responsive to the voltage and current of said booster and their relative directions for controlling said last mentioned means.

8. In combination, direct current mains, a rotary converter having a commutating field winding, a booster mechanically connected to said converter, means for varying and reversing the field of said booster, a set of resistances connected across said mains, means for changing the connection of said commutating field winding to said resistances and for reversing said field winding, and means responsive to the voltage and current of said booster and their relative directions for controlling said last mentioned means, said means comprising a contact making wattmeter, solenoids controlled thereby, clutches operated by said solenoids, and gearing.

9. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said commutating field winding, solenoids controlling the movement of the arms of the double dial rheostat, and a contact making wattmeter for closing the circuits of said solenoids, said contact making wattmeter having coils energized by the current and voltage of said booster.

10. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said commutating field winding, clutches for controlling said driving means, solenoids for operating said clutches, and a contact making wattmeter for closing the circuits of said solenoids, said contact making wattmeter having coils energized by the current and voltage of said booster.

11. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving the arms of said rheostat so as to change and reverse the voltage applied to said auxiliary commutating field winding, clutches for controlling said driving means, solenoids for operating said clutches and a contact making wattmeter for closing the circuits of said solenoids, said contact making wattmeter having a coil energized by the current flowing in one phase of said booster and another coil energized by the voltage generated in the same phase of said booster.

12. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, a motor for driving said arms, gearing interposed between said motor and said rheostat for reversing the direction of rotation of said arms, clutches for throwing said gearing into mesh for one or the other direction of rotation, solenoids for operating said clutches, and a contact making wattmeter for closing the circuits of said solenoids, said contact making wattmeter having coils energized by the current and voltage of said booster.

13. In combination, direct current mains, a rotary converter having a commutating field winding, a booster mechanically connected to said converter, means for varying and reversing the field of said booster, a double dial rheostat having arms and being connected across said mains, said commutating field winding being connected to the arms of said rheostat, a motor for driving said arms, gearing interposed between said motor and said rheostat for reversing the direction of rotation of said arms, clutches for throwing said gearing into mesh for one or the other direction of rotation, solenoids for operating said clutches and a contact making wattmeter for closing the circuits of said solenoids, said contact making wattmeter having a coil energized by the current flowing in one phase of said booster and another coil energized by the voltage generated in the same phase of said booster.

14. In combination, a rotary converter having a commutating field winding, a booster mechanically connected thereto, means for varying and reversing the field of said booster, means for varying and reversing the field produced by said commutating field winding, and means for controlling said last mentioned means comprising a contact making wattmeter having a wattmeter element and a balancing element.

15. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, and means for controlling said double dial rheostat comprising a contact making wattmeter, said contact making wattmeter having a wattmeter element and a balancing element.

16. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, a motor for driving said arms, solenoids controlling the movement of the arms of said double dial rheostat, and a contact making wattmeter for closing the circuits of said solenoids, said contact making wattmeter comprising a wattmeter element and a balancing element.

17. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, a motor for driving said arms, gearing interposed between said motor and said rheostat for reversing the direction of rotation of said arms, clutches for throwing said gearing into mesh for one or the other direction of rotation, solenoids for operating said clutches, and a contact making wattmeter for closing the circuits of said solenoids, said contact making wattmeter comprising a wattmeter element and a balancing element.

18. In combination, a rotary converter having a commutating field winding, a booster mechanically connected thereto, means for varying and reversing the field of said booster, means for varying and reversing the field produced by said commutating field winding, and means for controlling said last mentioned means comprising a contact making wattmeter having coils energized by the current and voltage of said booster.

19. In combination, a rotary converter having a commutating field winding, a booster mechanically connected thereto, means for varying and reversing the field of said booster, means for varying and reversing the field produced by said commutating field winding, and means for controlling said last mentioned means comprising a contact making wattmeter having a coil energized by the current flowing in one phase of said booster and another coil energized by the voltage generated in the same phase of said booster.

20. In combination, a rotary converter having a commutating field winding, a booster mechanically connected thereto, means for varying the field of said booster, means for varying the field produced by said commutating field winding, and means for controlling said last mentioned means comprising an element having coils energized by the current and voltage of said booster, and a balancing element having a coil energized by the current flowing through said commutating field winding.

21. In combination, a rotary converter having a commutating field winding, a booster mechanically connected thereto, means for varying and reversing the field of said booster, means for varying and reversing the field produced by said commutating field winding, and means for controlling said last mentioned means comprising an element having coils energized by the current and voltage of said booster, and a balancing element having a coil energized by the current flowing through said commutating field winding.

22. In combination, a rotary converter having a commutating field winding, a booster mechanically connected thereto, means for varying and reversing the field of said booster, means for varying and reversing the field produced by said commutating field winding, and means for controlling said last mentioned means comprising an element having a coil energized by the current flowing in one phase of said booster and another coil energized by the voltage generated in the same phase of said booster, and a balancing element having a coil energized by the current flowing through said commutating field winding.

23. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said commutating field winding, solenoids controlling the movement of the arms of the double dial rheostat, and a contact making wattmeter for closing the circuits of said solenoids, said contact making wattmeter having coils energized by the current and voltage of said booster, and a balancing element having a coil energized by the current flowing through said commutating field winding.

24. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, a motor for driving said arms, solenoids controlling the movement of the arms of said double dial rheostat, and a contact making wattmeter for closing the circuits of said solenoids, said contact making wattmeter comprising a wattmeter element having coils energized by the current and voltage of said booster, and a balancing element having a coil energized by the current flowing through said commutating field winding.

25. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said commutating field winding, clutches for controlling said driving means, solenoids for operating said clutches, and a contact making wattmeter for closing the circuits of said solenoids, said contact making wattmeter comprising a wattmeter element having coils energized by the current and voltage of said booster, and a balancing element having a coil energized by the current flowing through said commutating field winding.

26. In combination, direct current mains, a rotary converter having a commutating field winding, a booster mechanically connected to said converter, means for varying and reversing the field of said booster, a double dial rheostat having arms and being connected across said mains, said commutating field winding being connected to said arms of the rheostat, means for driving said arms so as to change and reverse the voltage applied to said auxiliary commutating field winding, clutches for controlling said driving means, solenoids for operating said clutches, and a contact making wattmeter for closing the circuits of said solenoids, said contact making wattmeter comprising a wattmeter element having a coil energized by the current flowing in one phase of said booster and another coil energized by the voltage generated in the same phase of said booster, and a balancing element having a coil energized by the current flowing through said commutating field winding.

27. In combination, direct current mains, a rotary converter having a commutating field winding, a booster mechanically connected to said converter, means for varying and reversing the field of said booster, a double dial rheostat having arms and being connected across said mains, said commutating field winding being connected to the arms of said rheostat, a motor for driving said arms, gearing interposed between said motor and said rheostat for reversing the direction of rotation of said arms, clutches for throwing said gearing into mesh for one or the other direction of rotation, solenoids for operating said clutches and a contact making wattmeter for closing the circuits of said solenoids, said contact making wattmeter comprising a wattmeter element having coils energized by the current and voltage of said booster, and a balancing element having a coil energized by the current flowing through said commutating field winding.

28. In combination, direct current mains, a rotary converter having a commutating field winding, a booster mechanically connected to said converter, means for varying and reversing the field of said booster, a double dial rheostat having arms and being connected across said mains, said commutating field winding being connected to the arms of said rheostat, a motor for driving said arms, gearing interposed between said motor and said rheostat for reversing the direction of rotation of said arms, clutches for throwing said gearing into mesh for one or the other direction of rotation, solenoids for operating said clutches, and a contact making wattmeter for closing the circuits of said solenoids, said contact making wattmeter comprising a wattmeter element having a coil energized by the current flowing in one phase of said booster and another coil energized by the voltage generated in the same phase of said booster, and a balancing element having a coil energized by the current flowing through said commutating field winding.

29. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for driving said arms so as to change and reverse the voltage applied to said commutating field winding, clutches for controlling said driving means, solenoids for operating said clutches and a contact making wattmeter for closing the circuits of said solenoids, said contact making wattmeter having coils energized by the current and voltage of said booster.

30. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, a motor for driving said arms, gearing interposed between said motor and said rheostat for reversing the direction of rotation of said arms, clutches for throwing said gearing into mesh for one or the other direction of rotation, solenoids for operating said clutches, and a contact making wattmeter for closing the circuits of said solenoids, said contact making wattmeter having coils energized by the current and voltage of said booster.

31. In combination, a rotary converter having a series commutating field winding and an auxiliary commutating field winding, a booster mechanically connected thereto, means for varying and reversing the field of said booster, means for varying and reversing the field produced by said auxiliary commutating field winding, and means for controlling said last mentioned means comprising a contact making wattmeter having coils energized by the current and voltage of said booster.

32. In combination, a rotary converter having a series commutating field winding and an auxiliary commutating field winding, a booster mechanically connected thereto, means for varying the field of said booster, means for varying the field produced by said auxiliary commutating field winding, and means for controlling said last mentioned means comprising an element having coils energized by the current and voltage of said booster, and a balancing element having a coil energized by the current flowing through said auxiliary commutating field winding.

33. In combination, a rotary converter having a series commutating field winding and an auxiliary commutating field winding, a booster mechanically connected thereto, means for varying and reversing the field of said booster, means for varying and reversing the field produced by said auxiliary commutating field winding, and means for controlling said last mentioned means comprising an element having coils energized by the current and voltage of said booster, and a balancing element having a coil energized by the current flowing through said auxiliary commutating field winding.

34. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for driving said arms so as to change and reverse the voltage applied to said auxiliary commutating field winding, solenoids controlling the movement of the arms of the double dial rheostat, and a contact making wattmeter for closing the circuits of said solenoids, said contact making wattmeter comprising a wattmeter element having coils energized by the current and voltage of said booster, and a balancing element having a coil energized by the current flowing through said auxiliary commutating field winding.

35. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, means for driving said arms so as to change and reverse the voltage applied to said auxiliary commutating field winding, clutches for controlling said driving means, solenoids for operating said clutches, and a contact making wattmeter for closing the circuits of said solenoids, said contact making wattmeter comprising a wattmeter element having coils energized by the current and voltage of said booster, and a balancing element having a coil energized by the current flowing through said auxiliary commutating field winding.

36. In combination, direct current mains, a rotary converter having a series commutating field winding and an auxiliary commutating field winding, a booster mechanically connected to said converter, means for varying and reversing the field of said booster, a double dial rheostat having arms and being connected across said mains, said auxiliary commutating field winding being connected to said arms of the rheostat, a motor for driving said arms, gearing interposed between said motor and said rheostat for reversing the direction of rotation of said arms, clutches for throwing said gearing into mesh for one or the other direction of rotation, solenoids for operating said clutches, and a contact making wattmeter for closing the circuits of said solenoids, said contact making wattmeter comprising a wattmeter element having coils energized by the current and voltage of said booster, and a balancing element having a coil energized by the current flowing through said auxiliary commutating field winding.

37. In a booster interpole rotary converter system, the combination with an interpole field winding, of a source of exciting current connected thereto, means for regulating the current supplied to said field winding from said source, motor means for operating said regulating means, said motor means comprising two mutually interacting elements, one of which is energized proportionally to the booster current and the other of which is energized proportionally to the booster voltage.

38. In a booster interpole rotary converter system, the combination with an interpole field winding, of a source of exciting current connected thereto, means for regulating the current supplied to said field winding from said source, motor means for operating said regulating means, said motor means comprising two mutually interacting elements, one of which is energized proportionally to the booster current and the other of which is energized proportionally to the booster voltage, both in direction and in magnitude.

39. In a booster interpole rotary converter system, the combination with an interpole field winding, of a source of exciting current connected thereto, means for regulating the current supplied to said field winding from said source, a wattmeter mechanism coupled to adjust said regulating means, means for energizing the voltage winding of said wattmeter mechanism proportionally to the booster voltage, and means for energizing the current winding of said wattmeter mechanism proportionally to the booster current.

40. In a booster interpole rotary converter system, the combination with an interpole field winding, of a source of exciting current connected thereto, means for regulating the current supplied to said field winding from said source, a wattmeter mechanism coupled to adjust said regulating means, means for energizing the voltage winding of said wattmeter mechanism proportionally to the booster voltage both in direction and magnitude, and means for energizing the current winding of said wattmeter mechanism proportionally to the booster current.

41. The method of energizing the interpole field winding of an interpole-type booster rotary converter which comprises supplying thereto two magnetizing components, one of which varies directly with the rotary converter load current and the other of which varies directly with the energy electrically interchanged between the booster machine and the supply circuit.

42. In an exciting system for the commutating field poles of a booster type interpole rotary converter, the combination with at least one of the commutating field windings, of a source of exciting current, connections from said source to said field winding, electro-responsive means subject to the control of the energy conversion of the booster machine, and means subject to the control of said electro-responsive means for adjusting the exciting current supplied to said commutating field winding.

43. In an exciting system for the commutating field poles of a booster type interpole rotary converter, the combination with at least one of the commutating field windings, of motor means responsive to the actual electrical energy transferred between the supply system and the booster machine, and means subject to the control of said motor means for adjusting the exciting current supplied to said commutating field winding.

44. In an exciting system for commutating field poles of a booster type interpole rotary converter, the combination with at least one of the commutating field windings, of a source of exciting current, connections from said source to said field winding, motor means responsive to the actual electrical energy transferred between the supply system and the booster machine, and means subject to the control of said motor means for adjusting the exciting current supplied to said commutating field winding, both in direction and magnitude.

In testimony whereof, I have hereunto set my hand this 17th day of April, 1915.

JOHN B. BASSETT.

Witnesses:
BENJAMIN B. HULL,
HELEN ORFORD.